Patented Mar. 16, 1948

2,438,097

UNITED STATES PATENT OFFICE 2,438,097

THERMOSETTING VINYL CHLORIDE-VINYL-IDENE CHLORIDE COPOLYMER COMPOSITIONS

Thomas H. Rogers, Jr., and Robert D. Vickers, Akron, Ohio, assignors to Wingfoot Corporation, Akron, Ohio, a corporation of Delaware No Drawing. Application December 29, 1943, Serial No. 516,052

6 Claims. (Cl. 260—86)

1

This invention relates to improved plastic compositions having desirable thermosetting characteristics and to a method of making the same. More particularly, it relates to the effect of quaternary ammonium bases in the curing of polymerized masses, as well as to the effect of phenol-formaldehyde type resins in conjunction with said quaternary ammonium bases.

A thermoplastic resin which can be made thermosetting is obviously desirable in the manufacture of molded parts where the resin must be easily manipulable before setting and comparatively immobile after it has been given its final shape. This is also true in the manufacture of extruded articles where the resin must be soft enough in the uncured state to be extruded and then, when subjected to pressure and heat, to become set. Also, a resin having these characteristics would find use in the building of structures from fabric coated with the resin, such as pontoons, inflatable boats, and gas containers. In the manufacture of such fabric articles, a seam which is sealed with the resin must be capable of withstanding a test load at an elevated temperature without flow. A method of treating resins which would effect the desired thermosetting would be, therefore, of great value. The present invention has as an object the provision of plastic compositions affording the above-indicated advantages. Another object is the provision of a method of treating resins to secure this result. According to the terms of this invention, certain polymerized compositions which have desirable properties as plastics for the production of molded parts and other purposes are so treated as to increase their strength and resistance to flow, and also to reduce their solubility in solvents by curing the compositions in a prescribed manner. The compositions which have been found to be amenable to the treatment are copolymers made by polymerizing monomeric material including vinylidene chloride and vinyl chloride. The treatment comprises curing or vulcanizing the copolymer by heating the same in the presence of a quaternary ammonium base which results in a composition of improved modulus as compared with the uncured stock, and also of greatly lessened or wholly eliminated solubility in various solvents, such as methyl ethyl ketone. The invention also comprises the curing of the copolymer in the presence of a heat-hardenable or thermosetting phenol-formaldehyde type resin, in addition to the quaternary ammonium base, the presence of one of the Bakelite resins, as these are commercially known, resulting in a product of similar physical characteristics but with a flatter curing curve.

The plastics which are thus improved in physical characteristics by treatment, according to the hereindescribed method, are those containing

2 from 10% to approximately 25% of vinylidene chloride, the balance of the monomeric mixture, 90% to 75%, from which the copolymer is made, being vinyl chloride. Particularly good results are obtained by the treatment of copolymers ranging from about 10% to 20% of vinylidene chloride, and correspondingly, from about 90% to 80% of vinyl chloride. Among others, many commercial resins may be treated with advantage, including copolymers of vinyl chloride-vinylidene chloride 85:15, and vinyl chloride-vinylidene chloride 90:10. It has been determined that an increase in tensile strength of at least 50% over that of the uncured copolymer should be attained in order to give results of practical importance; increases of less than this amount do not improve the characteristics of the plastics sufficiently to make them valuable for the uses herein described.

The method is accomplished by heating the resin to a curing temperature, such as a temperature between 240° F. and 360° F., although the temperature may be higher or lower than this, in the presence of a quaternary ammonium base, such as trimethyl benzyl ammonium hydroxide, betaine, triethyl benzyl ammonium hydroxide, tetramethyl ammonium hydroxide, dimethyl ethyl benzyl ammonium hydroxide and salts of these and other quaternary ammonium bases formed from acids, such as the acetate, formate, benzoate and oxalate. These acid salts break down to yield the base during the cure, and are, therefore, the equivalents of the bases themselves in the process. The quaternary ammonium base, or acid salt thereof, is used in the proportion of about 1% to 10% on the weight of the plastic or copolymer, but best results are usually obtained when 4% to 6% is used. Where a heat-hardenable or thermosetting phenol-formaldehyde type resin is also employed, it will be present to the extent of about 2% to 10%, preferably 5% to 10%. Among the "phenolics" which may be used are cresol-formaldehyde resin, phenol ($C_6H_5OH$) formaldehyde resin, xylenol-formaldehyde resin, resorcinol-formaldehyde resin, and phenol ($C_6H_5OH$) furfural resin.

In addition to the quaternary ammonium base, or the quaternary ammonium base and phenol-formaldehyde type resin, there may be present in the stock to be cured an acid inhibitor or acceptor, such as magnesium oxide, sodium carbonate or magnesium carbonate, which, while it may be omitted, aids in preventing the deterioration of the composition at the elevated temperatures of cure and thus gives optimum physical properties. Magnesium oxide is particularly valuable in this respect. There will also be present, in most instances, a plasticizer such as dibutyl sebacate, methoxy ethyl oleate, dioctyl phthalate, tributyl phosphate, and the like, although it will be understood that the plasticizer is not strictly necessary in carrying out the method of the invention. However, the plasticizer may effect the rate of cure and, to this extent, must be considered in connection with the performance of the process. Also the plasticizer is required in varying amounts to give a stock of selected characteristics, the desired improvement being obtained as a result of the influence of the cure in the presence of the plasticizer. Carbon black and other pigments may also be present as desired.

To illustrate the invention, the following example is given, the same being purely illustrative and not intended in a limiting sense.

*Example*

A suitable stock was prepared by mixing granular or powdered vinyl chloride-vinylidene chloride copolymer 85:15 with about 25% of the total dibutyl sebacate to be added as a plasticizer. The mix was then placed on a hot mill. After ten minutes mixing, the remainder of the dibutyl sebacate was added, followed by magnesium oxide and carbon black in the proportions indicated below. Before the quaternary ammonium base is added to the mass, the mill is cooled by running cold water through it. Four parts of either trimethyl benzyl ammonium hydroxide or betaine were added with thorough mixing, and the stock was then sheeted out and cut for cure. The stock was cured by placing between aluminum foil to prevent sticking, and cured in a press at a temperature of 320° F. under a pressure of 1,500 pounds p. s. i. A basic stock such as this may be additionally compounded, if desired, as with lecithin, so as to be readily removed directly from a hot mold, using no aluminum foil.

The following results were obtained upon test of a copolymer prepared from 85 parts of vinyl chloride and 15 parts of vinylidene chloride, the tensile strength and elongation being determined on an autographic Scott machine, and solubility in methyl ethyl ketone (MEK) being determined by rubbing the cured stock with a cloth saturated with the solvent, the carbon black in the stock serving as an indicator.

*Formulae*

|  | (1) | (2) | (3) |
|---|---|---|---|
| Polymer | 100.00 | 100.00 | 100.00 |
| Dibutyl sebacate | 35.00 | 35.00 | 35.00 |
| Mgo | 5.00 | 5.00 | 5.00 |
| Carbon black | 1.00 | 1.00 | 1.00 |
| Lecithin |  |  | 2.00 |
| Trimethyl benzyl ammonium hydroxide |  | 4.00 |  |
| Tetramethyl ammonium hydroxide |  |  | 4.00 |

*Results*

| Cure | 320° F. | 320° F. | 290° F. |
|---|---|---|---|
| Tensile in kg./cm.² at room temp.: |  |  |  |
| 10 min | 42 | 145 | 154 |
| 20 min | 52 | 136 | 165 |
| 40 min | 58 | 157 | 175 |
| 60 min | 55 |  | 182 |
| Elong. at room temp. in per cent: |  |  |  |
| 10 min | 200 | 275 | 210 |
| 20 min | 250 | 200 | 220 |
| 40 min | 250 | 225 | 170 |
| 60 min | 250 |  | 150 |
| Solubility[1] in methyl ethyl ketone: |  |  |  |
| 10 min | S | NS | NS |
| 20 min | S | NS | NS |
| 40 min | S | NS | NS |
| 60 min | S | NS | NS |

[1] S—soluble; NS—not soluble.

It will be noted that the tensile strength was more than doubled by the use of one of the above-described quaternary ammonium bases over that obtained when the cure was conducted in the absence of the ammonium base. As mentioned, best results are obtained when an acid inhibitor or acceptor, particularly magnesium oxide, is present, but magnesium oxide in the absence of a quaternary ammonium base does not give the desired improvement in tensile strength. The influence of the quaternary ammonium base on solubility is clearly shown, samples containing the quaternary ammonium base, but not those without it, becoming insoluble in methyl ethyl ketone (MEK) when the cure is sufficiently advanced.

It will be obvious that a composition of increased tensile strength and resistance to flow and of comparative insolubility with respect to solvents, of which methyl ethyl ketone is merely exemplary, is of great value in structures and articles which are subject to strain and exposed to solvents in use. Results obtained with the use of both a quaternary ammonium base and a heat-hardenable phenol-formaldehyde type resin are similar, but the stock displays the improved physical characteristics over a wider range of curing periods with little or no diminution of strength.

The products treated by the hereindescribed method have their properties improved in a number of respects, all tending toward materials with more useful characteristics. As mentioned, the tensile strength is increased, this being true both at room temperature and at higher temperatures, such as 135° F., a temperature often used as a standard in testing the strength of adhesive materials. At the same time, the tendency of the resin to cold flow is sharply reduced, while no appreciable increase in hardness is apparent. The shear strength is also greatly improved.

The products may be described as resins comprising a copolymer of vinylidene chloride and vinyl chloride, plus the residue of a substituted quaternary ammonium base and of a phenol-formaldehyde type resin where used. Upon heating such a mixture, either with or without a plasticizer, a profound change in physical properties takes place and the resin becomes thermosetting. Accompanying this is a change in the chemical structure of the resin, as evidenced by nitrogen extraction, and, more particularly, chlorine extraction. Thus, more nitrogen can be extracted from an uncured sample than can be extracted from a cured sample. Similarly and perhaps more significantly, less chlorine can be extracted from an uncured sample than can be extracted from a cured sample of the same original composition and of the same weight. This indicates a labilization or loss of chlorine from the copolymer, that is to say, the chlorine is disengaged and is presumably taken up by the magnesium oxide, or other inorganic substance which may be present, to form magnesium chloride or other easily extractable material. As a consequence of the removal or transference of some of the chlorine atoms in the vinyl chloride or vinylidene chloride, bonds are made available for further polymerization of the organic constituents of the resin. Hence, the resin sets under the influence of heat and becomes hard and strong. If a phenol-formaldehyde resin also be present, further combination may take place between the copolymer and resin or between these and the quaternary ammonium base.

Therefore, while the chemical mechanism of the curing operation is not definitely established, it appears that the vulcanizates obtained by the use of one of the described class of quaternary ammonium bases as a curing agent generally contain nitrogen in a form which is much less readily extractable than is the nitrogen present in the uncured composition, and this despite the fact that the quaternary ammonium base is a substance made readily extractable from the uncured compositions. Furthermore, the presence of ionizable chlorine in extractions of the cured samples would indicate removal of chlorine from the polymer chain. Naturally, the phenolic resin will be represented in the cured material as a residue, and probably in combination with the other ingredients.

As stated above, many quaternary ammonium bases may be used for the purposes of the invention, those mentioned being merely exemplary and representative of the class as a whole. Other "phenolics" may also be used in addition to those mentioned, but cresol-formaldehyde resin is preferred. Usually the resins employed have a composition corresponding to combining proportions or equimolecular proportions of the phenolic compound and the aldehyde.

While there has been described above a preferred embodiment of the invention, it will be apparent to those skilled in the art that various modifications and changes may be made therein without departing from the spirit of the invention or from the scope of the appended claims.

We claim:

1. A method of preparing a thermoset composition from a thermoplastic copolymer of 75 to 90 percent of vinyl chloride and the balance of vinylidene chloride which comprises incorporating from 1 to 10 percent by weight (based on the copolymer) of a quaternary ammonium compound and thereafter heating the modified copolymer to a temperature between 240° F. and 360° F. for a period of from 15 to 30 minutes.

2. A method of preparing a thermoset composition from a thermoplastic copolymer of 75 to 90 percent of vinyl chloride and the balance of vinylidene chloride which comprises incorporating from 1 to 10 percent by weight (based on the copolymer) of a quaternary ammonium compound and from 2 to 10 percent of a heat-hardenable phenol-aldehyde resin and thereafter heating the modified copolymer to a temperature between 240° F. and 360° F. for a period of from 15 to 30 minutes.

3. A method of preparing a thermoset resinous composition from a thermoplastic copolymer of 75 to 90 percent of vinyl chloride and the balance of vinylidene chloride which comprises heating said copolymer to a temperature between 240° F. and 360° F. in the presence of 1 to 10 percent by weight (based on the copolymer) of a quaternary ammonium base for a period of 15 to 30 minutes.

4. A method of preparing a thermoset resinous composition from a thermoplastic copolymer of 75 to 90 percent of vinyl chloride and the balance of vinylidene chloride which comprises heating said copolymer to a temperature between 240° F. and 360° F. in the presence of 1 to 10 percent by weight (based on the copolymer) of a quaternary ammonium base and from 2 to 10 percent of a heat hardenable phenol aldehyde resin for a period of 15 to 30 minutes.

5. A method of preparing a thermoset resinous composition from a thermoplastic copolymer of 75 to 90 percent of a vinyl chloride and the balance vinylidene chloride which comprises heating said copolymer to a temperature between 240° F. and 360° F. in the presence of 1 to 10 percent by weight (based on the copolymer) of tetramethyl ammonium hydroxide for a period of from 15 to 30 minutes.

6. A method of preparing a thermoset resinous composition from a thermoplastic copolymer of 75 to 90 percent of a vinyl chloride and the balance vinylidene chloride which comprises heating said copolymer to a temperature between 240° F. and 360° F. in the presence of 1 to 10 percent by weight (based on the copolymer) of trimethyl benzyl ammonium hydroxide.

THOMAS H. ROGERS, Jr.
ROBERT D. VICKERS.

REFERENCES CITED

The following references are of record in the file of this patent:

UNITED STATES PATENTS

| Number | Name | Date |
| --- | --- | --- |
| 2,148,831 | Raynolds | Feb. 28, 1939 |
| 2,235,782 | Wiley | Mar. 18, 1941 |
| 2,270,662 | Raney | Jan. 20, 1943 |
| 2,304,637 | Hardy | Dec. 8, 1942 |
| 2,336,792 | Langkammerer | Dec. 14, 1943 |